(12) United States Patent
Schlapkohl et al.

(10) Patent No.: US 9,279,579 B2
(45) Date of Patent: Mar. 8, 2016

(54) VACUUM CLEANER INLET DOOR LIGHTING DEVICE

(71) Applicant: IVD Global Corporation, Palm City, FL (US)

(72) Inventors: Peter Schlapkohl, Jupiter, FL (US); Lisa Fitzgerald, Sarasota, FL (US)

(73) Assignee: IVD Global Corporation, Palm City, FL (US)

( * ) Notice: Subject to any disclaimer, the term of this patent is extended or adjusted under 35 U.S.C. 154(b) by 103 days.

(21) Appl. No.: 14/251,126

(22) Filed: Apr. 11, 2014

(65) Prior Publication Data
US 2015/0292730 A1    Oct. 15, 2015

(51) Int. Cl.
| F21V 33/00 | (2006.01) |
| F21V 23/00 | (2015.01) |
| A47L 9/00 | (2006.01) |
| F21V 8/00 | (2006.01) |
| A47L 5/38 | (2006.01) |
| A47L 9/30 | (2006.01) |
| F21Y 101/02 | (2006.01) |

(52) U.S. Cl.
CPC ............... *F21V 33/0044* (2013.01); *A47L 5/38* (2013.01); *A47L 9/00* (2013.01); *A47L 9/30* (2013.01); *G02B 6/0005* (2013.01); *F21Y 2101/02* (2013.01)

(58) Field of Classification Search
CPC ...... F21V 33/0044; A47L 9/00; G02B 6/0005
See application file for complete search history.

(56) References Cited

U.S. PATENT DOCUMENTS

| 5,279,016 A | 1/1994 | Klassen |
| 5,504,967 A | 4/1996 | Graham |
| 6,108,858 A | 8/2000 | Smith |
| 6,158,080 A | 12/2000 | Schlapkohl |
| 6,292,977 B1 | 9/2001 | Mantyla et al. |
| 6,856,113 B1 * | 2/2005 | Cunningham ............ A47L 5/38 15/314 |
| 7,581,281 B2 | 9/2009 | Schlapkohl |
| 2008/0301903 A1 * | 12/2008 | Cunningham .......... A47L 9/281 15/410 |

* cited by examiner

*Primary Examiner* — Elmito Breval
(74) *Attorney, Agent, or Firm* — McHale & Slavin, P.A.

(57) ABSTRACT

A vacuum cleaner inlet door lighting device for illuminating the area directly in front of a vacuum cleaner wall mounted inlet. The lighting device includes LED's operated upon the opening of a rotatable door have a directional pattern for optimum illumination. The LED's are mounted behind the rotatable door to cause illumination when the rotatable door is open. In an alternative embodiment the LED's are remotely mounted using fiber optic cabling for direction of the light when the rotatable door is opened. When the rotatable door opens the area in front of the wall mounted inlet is illuminated so that the dirt and debris can be seen while being pushed into the collection container. When the rotatable door is closed, the illumination is turned off.

14 Claims, 5 Drawing Sheets

VACUUM CLEANER INLET DOOR LIGHTING DEVICE

FIELD OF THE INVENTION

The instant invention relates to the field of fixed vacuum cleaning systems and, in particular, to a lighting device used for illuminating the area in front of a vacuum cleaning system having a wall mounted inlet door.

BACKGROUND OF THE INVENTION

Vacuum cleaning systems are a modern convenience and used in most all homes, offices and commercial establishments. These systems generally utilize a unitary centrally located station containing a vacuum supply coupled to a collection receptacle and a plurality of conduits which interconnect various parts of the structure to the central station. The conduits can either terminate in a hose adapter coupling enabling each area to be cleaned by inserting the hose assembly into a hose coupling or terminate with an inlet door where debris can be drawn into the vacuum supply system.

Central vacuum systems with wall mounted inlet doors are in the prior art. For instance, U.S. Pat. No. 5,504,967 discloses a combined inlet structure and switching device for a central vacuum system which includes an inlet housing having top, bottom and side walls defining a vacuum inlet chamber and a front with a dirt receiving opening. An aperture located in the top wall and can be connected to a pipe leading to a central vacuum source. A closure member is movable between first and second positions in order to close or open the aperture. A foot operated actuator is connected to the housing and is able to pivot the closure member between the first and second positions. A spring biases the closure member towards the first position and operates when the actuator is pressed in one direction. When the closure member is moved to the second position, it will remain there unless the actuator is pressed in another, opposite direction. There is also a switch mechanism responsive to movement of the actuator for opening and closing an electrical circuit connected to the central vacuum source.

U.S. Pat. No. 5,279,016 discloses a suction inlet for a central vacuum system of a building which includes a housing mounted on the floor of the building thereby defining a slot along the floor. The slot can be opened and closed and simultaneously a vacuum duct connected to the housing is opened and closed by a plug member. When the plug and the slot are opened, a switch actuates the central vacuum system to draw air into the housing through the slot across the floor so that dust, dirt and debris on the floor can simply be swept into the slot and drawn away.

U.S. Pat. No. 6,292,977 discloses a vacuum fitting for connection to a remote source of vacuum, such as a central vacuum system. The vacuum fitting comprising a main body mountable to a fixed structure. The main body includes an inlet opening and an outlet opening; an openable closure is mounted to the main body and is moveable between an open position and position covering the inlet opening; a latch member is selectively positionable to keep the closure in said covering position when positioned between the main body and the closure and to permit said closure to move to an open position when not positioned between said main body and the closure; and a biaser to urge the closure to an open position. A switch is also provided to initiate the remote source of vacuum, such as a central vacuum system, when the closure is moved to the open position by the biaser.

U.S. Pat. No. 6,108,858 discloses a waste receptacle for a vacuum cleaning system. The waste receptacle is a floor mounted sweeping suction inlet is provided with a rotatable door that carries a user-activated portion by which the rotatable door may be opened by contact from a foot. The vacuum source can be turned-on automatically by opening the rotatable door by the presence of a door-activated electrical switch. An adapter converts the floor-mounted vacuum opening to a standard circular opening for receiving a vacuum hose and wand.

U.S. Pat. No. 6,158,080 discloses improvements in the operation and design of wall-mounted recessed vacuum cleaner systems. The disclosed invention incorporates an extremely compact motor design which enables the filtering debris receptacle to be arranged directly over the motor housing. The vacuum system of the disclosed invention includes an upper containment compartment and a lower evacuation compartment. The containment compartment houses an air filtering and residue collecting receptacle, e.g. a vacuum bag assembly, which may incorporate HEPA filtration characteristics.

U.S. Pat. No. 7,580,281, issued to the inventor of the present invention, discloses an improved wall-mounted recessed vacuum cleaner system which incorporates vibration dampening mounts between the motor and the outer housing, air channels within the housing to smooth air flow and reduced number of parts to significantly reduce the noise level during operation. The vacuum cleaner system incorporates an extremely compact housing and motor design with a filtering debris receptacle arranged directly over the motor compartment.

What is lacking in the art is an improved lighting system for illuminating the area in front of wall mounted inlet doors.

SUMMARY OF THE INVENTION

The present invention is a vacuum cleaner inlet door lighting device. Vacuum cleaner inlet doors are mounted to a wall structure employing a frame with a rotatable door. The inlet doors are positioned adjacent the floor allowing an individual to clean the floor by sweeping dirt and debris towards the inlet door wherein a vacuum drawn through the inlet door is used to remove the dirt and debris. By incorporating the lighting device into the inlet door and placing LED lighting elements at a particular azimuth plane and horizontal plane angle, the area directly in front of the inlet is illuminated allowing the individual to assure all dirt and debris has been drawn through the inlet door. When the a rotatable door on the inlet door is closed, the light is extinguished. The lighting device is positioned behind the rotatable door and may include an optical fiber guide for directional positioning of the light.

Accordingly, it is an objective of the present invention to provide an illumination device for the inlet door of a vacuum cleaning system that is optimized by positioning of an LED along a particular azimuth plane and horizontal plane angle.

It is a further objective of the present invention to provide an inlet door control system to allow illumination light when the inlet door is opened and extinguishes the illumination light when the inlet door of the inlet is closed.

It is yet another objective of the present invention to provide an illumination light having a remotely positioned LED with light drawn to the front of the inlet door by use of an optical fiber.

Still another objective of the invention is teach the use of a directional aperture for focusing light at an azimuth angle of about thirty one degrees relative to center line of the vacuum pan assembly and about twenty five degrees in elevation relative to the horizontal plane of the vacuum pan assembly.

Another objective of the invention is to teach the use of a current limited resistor to limit the driving current to an LED to about 0.030 amps and employ a diode to limit reverse voltage when used with a wall mounted vacuum assembly.

Yet another objective of the invention is to electrically couple the illumination circuitry in series to a facility control wiring to energize a distant relay for activating a central vacuum system.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
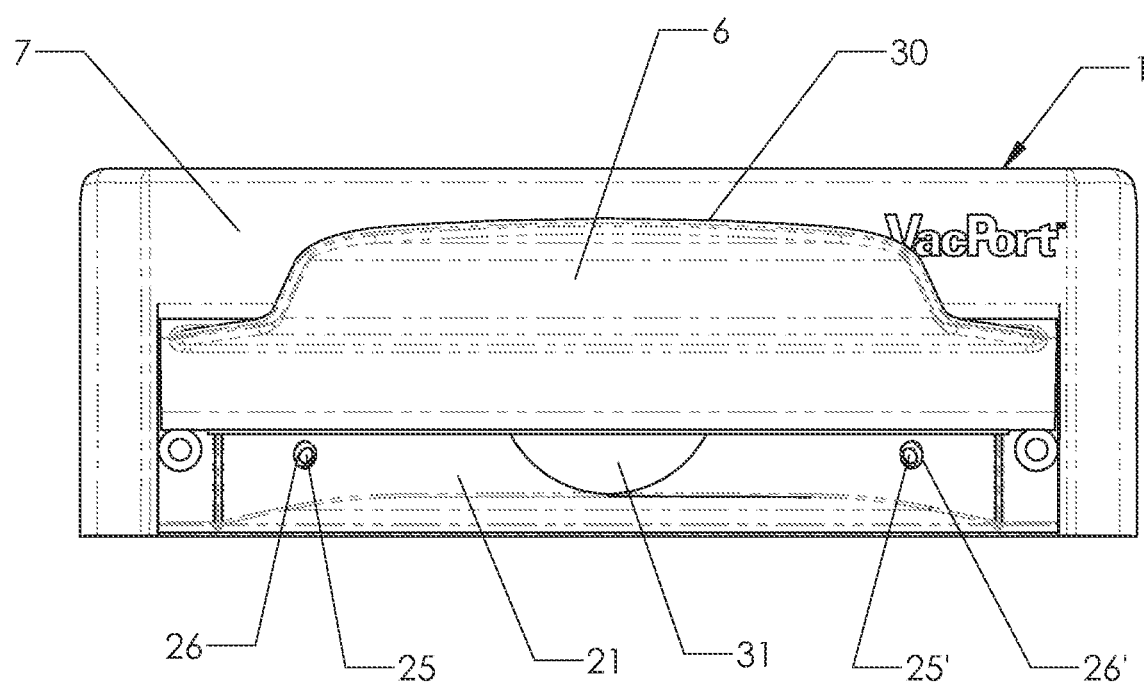
FIG. 1 is a front view of the inlet door with an illumination device of the instant invention mounted.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
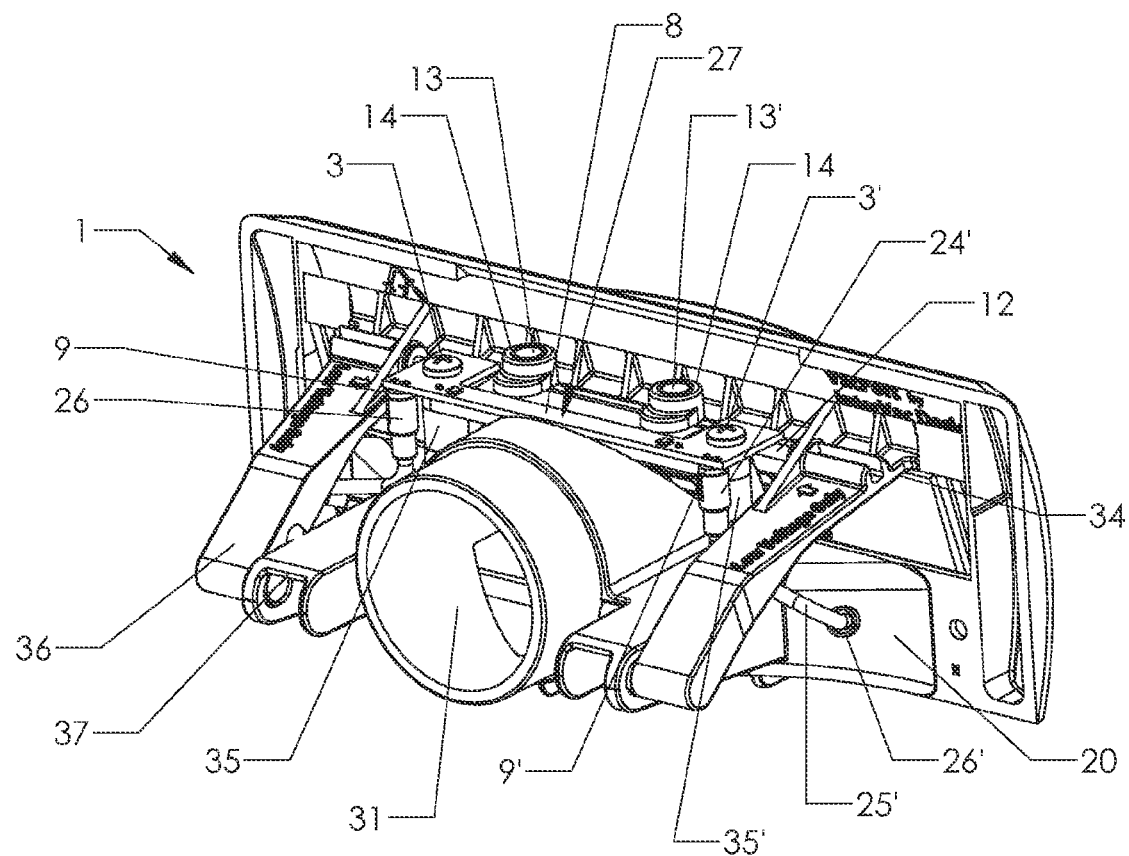
FIG. 2 is a rear perspective view of FIG. 1.
Figure 3:
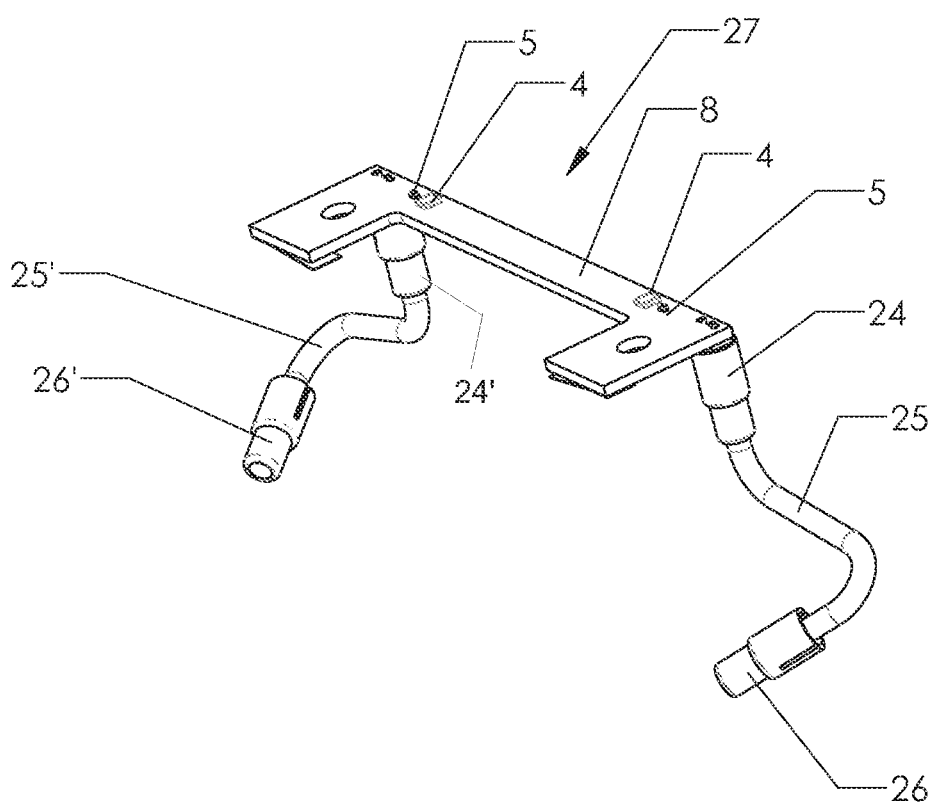
FIG. 3 is an upper perspective view of the illumination device.
Figure 4:
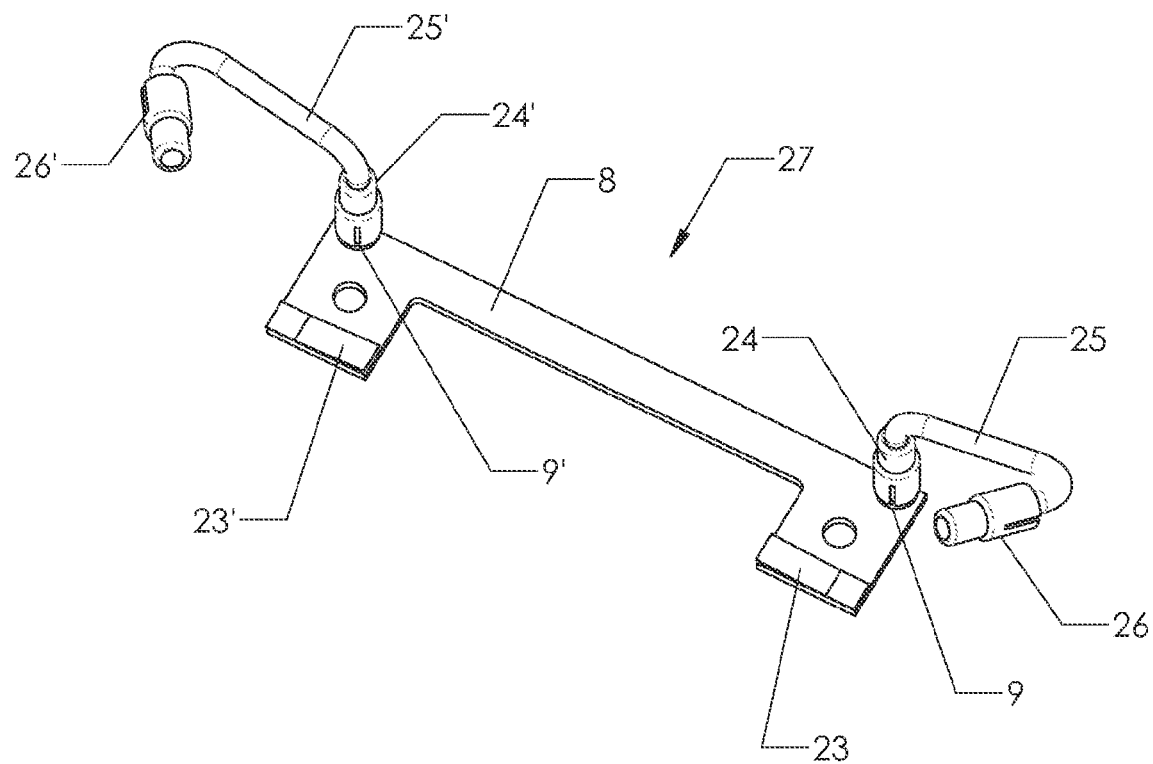
FIG. 4 is a lower perspective view of FIG. 3.
Figure 5:
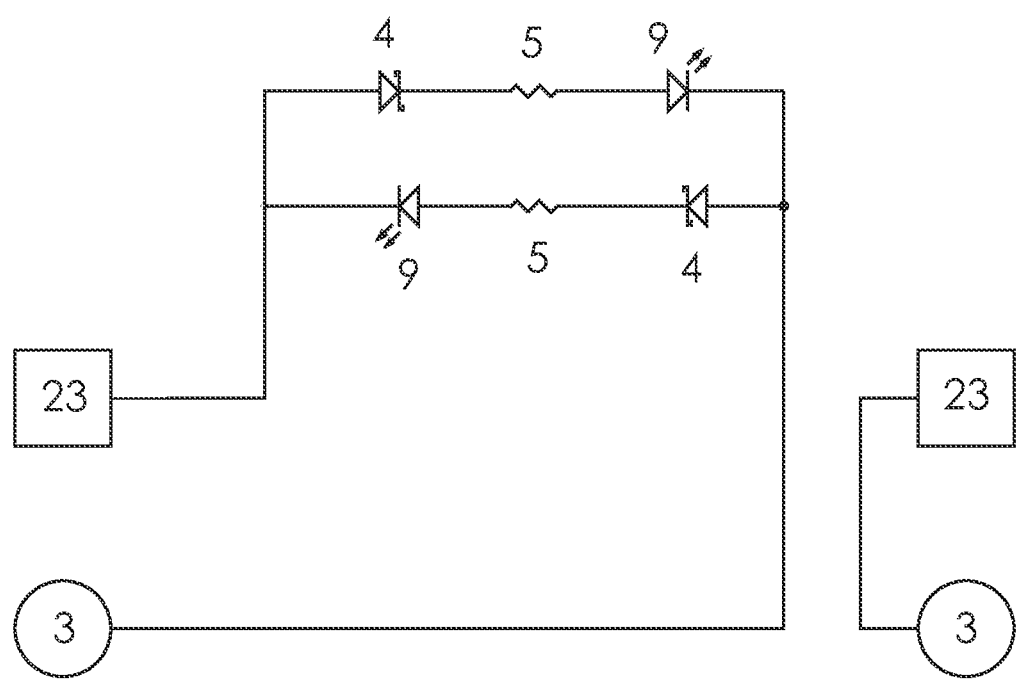
FIG. 5 is an electrical schematic top view of the present invention.

Now referring to FIGS. 1 and 2, illustrated is the present invention assembled onto a vacuum pan assembly. In particular the vacuum pan assembly, also referred to as the inlet housing 1, consists of a main frame 7 and a rotatable door 6 hingedly attached to the main frame 7. A vacuum cleaning system is normally employed when an individual is cleaning a floor. This cleaning process comprises sweeping up of debris on the floor of the room into a pile. Without the present invention, the pile of debris would normally be picked up with a dust pan. The use of a dust pan can result in not all of the debris being picked up and removed from the room. The present invention enables the individual to sweep the debris toward the inlet housing 1, open the rotatable door 6 causing illumination of the area before the inlet wherein the debris is sweep into the inlet housing 1. The vacuum cleaning system transports the debris to a container where it can be stored until the individual empties the container and disposes of the debris. The vacuum cleaning system assures that all of the debris that is swept into the inlet housing 1 is removed from the room and deposited into a container where it can be safely stored for later disposal.

The main frame and rotatable door 6 are preferably constructed from a thermoplastic material with the rotatable door 6 including a shaped door actuator 30 for ease of opening and closing using an aesthetically pleasing shape. The opening of the rotatable door 6 is accomplished by an individual placing their foot beneath the shaped door actuator 30 and raising the rotatable door 6 upon raising their foot. When the rotatable door 6 is in its fully open position, dirt and/or debris can be drawn into the vacuum cleaning system through a collection chamber 21 for funneling in the outlet port 31. The outlet port 31 is coupled to a remote vacuum source, not shown, for removal of dirt and debris.

Lighting elements are provided by first optical fiber 25 and a second optical fiber 25'. Alternatively first and second LED can be mounted directly in the chamber. The LED's operate when the rotatable door 6 which engages a circuit board 8 which is fastened to the main frame 7 via a first contact 23 and a second contact 23' to compete a low voltage electrical connection upon engagement with a contact bar 12.

The door actuator 30 can also be operated by hand, by a broom, or by most any other another object. The rotatable door 6 is closed by placing the individual's foot or other object on the top of the door actuator 30 and pushing the rotatable door 6 downwardly into a closed position. The contact rod 12 is secured within contact rod channels 34 for use in maintaining the rotatable door 6 in an open position and, in this embodiment, providing an actuator for the LED upon engaging the first and second contact 23 and 23'. The contact rod 12 is preferably formed from magnetic stainless steel or the like electrically conductive materials. The contact bar 12 is snap-fit into rotatable door 6 and the rotatable door 6 is hinged on the main frame 7 to allow the rotatable door 6 to be in an open position for normal vacuum operation.

When the rotatable door 6 is placed into an open position, the contact bar 12 contacts the circuit board contacts 23 and 23' to make a series circuit through the light emitting diode assembly 2. A distant control relay starts the vacuum and the two light emitting diodes 9 illuminate. In this position two magnets 13 retained by magnet holder 14 biases the contact bar 12 against the printed circuit board contacts 23 by means of magnetic flux. When the rotatable door 6 is placed into a closed position, the light is extinguished.

Applicant's U.S. Patent Application entitled Inlet for Vacuum Cleaning Apparatus Ser. No. 13/485,313 filed May 31, 2012 and U.S. Patent Application entitled Illuminated Inlet for Vacuum Cleaning Apparatus Ser. No. 13/762,122 filed Feb. 7, 2013 includes a teaching for a vacuum assembly and illumination device, the contents of each patent application are fully incorporated herein by reference.

In the preferred embodiment, a fiber optic cable is used in combination with a light emitting diode assembly 27 wherein light emitting diodes 9 and 9' are mounted on the printed circuit board 8 and a fiber optic cable 25 and 25' transfers the light energy from the light emitting diodes to the illumination area 16. The distal end of the fiber optic may include a diffuser or otherwise be shaped for optimum light transfer. The light emitting diodes 9 and 9' are connected to the fiber optic cable 25 and 25' by means of a fiber optic cable retainer 26 and 26'. Directional apertures 24 and 24' are placed on the distal end of the fiber optic cable 25 and 25' to interface formed into the chamber 31 of the main frame 7. This directional apertures provide predetermined angles for distribution of the light along an illumination pattern 15 having an azimuth and horizontal angle when holding the LED's or cable. The illumination pattern has been determined the most optimum area required for illumination in front of the inlet door.

The main frame 7 includes contacts 23 and 23' and a circuit board 8 that is removably secured the main frame screw bosses 35 and 35' by contact screws 3 and 3'. The screw bosses are integrally formed with the main frame 7 to enable the inlet housing 1 to be readily disconnected from the electrical system of the vacuum cleaning system for repair or replacement. Retainers 14 and 14' secures magnets 13 and 13' capable of attracting contact rod 12 when the contact rod 12 is in the near vicinity of the magnets 13 and 13'. This occurs when the rotatable door 6 is moved to the open position. This magnetic flux attracts the metallic contact rod 7 toward the magnets 13 and 13'. This magnetic attraction retains the rotatable door 6 in its open position and contact bar 12 in contact with the printed circuit board contacts.

Electrical wires (not shown) are connected to both electrical contacts 23 and 23'. The electrical wires are connected to a source of electrical power. When an electrical connection is established between both electrical contacts 23 and 23' by the contact rod 12, electrical power is delivered to the LED for either direct illumination or illumination in combination with the fiber optic cable. When the contact rod 12 is removed from both contacts 23 and 23', electrical power is shut off to the LED extinguishing the light source.

The rotatable door 6 moves between a closed and an open position by its connection to pivot arms 36 at the rear side of the rotatable door. The pivot arms 36 are secured to the rear of the rotatable door using pivot axles 37. The pivot axles 37 are pivotally secured within oval or elliptical pivot arm slots. The oval or elliptical shape enables the pivot arms 36 and the rotatable door 6, connected thereto, to move forward and backwards with respect to the front of the inlet housing 1.

Each light emitting diode 9 or fiber optic cable is mounted in a retainer 26 and 26' in the rear vacuum chamber wall 20 on the mainframe 7. The retainer is fixed at an azimuth angle of thirty one degrees in relative to the mainframe center line and twenty five degrees in elevation relative to the horizontal plane. This allows the each light emitting diode 9 to project through the vacuum chamber and onto the floor in front of the vacuum pan. This sets the light emitting diode 9 at the correct angle for the illumination pattern to converge at the center of the preferred illumination area 16.

The light emitting diode assembly 27 is constructed from a printed circuit board 8, two light emitting diodes 9, two protection diodes 4, two current limiting resistors 5 and two printed circuit board contacts 23. The current limiting resistor 5 limits the driving current to 0.030 amps in each light emitting diode 9 circuit. The protection diode 4 limits the reverse voltage in each light emitting diode 9 circuit. An anode wire and a cathode wire connect the light emitting diodes 9 to the printed circuit board 8. The light emitting diode assembly 27 is connected in series with typical facility control wiring to energize a distant relay thereby activating a central vacuum system. These systems are typically 24 to 36 VAC. The control wiring is connected to the light emitting diode assembly 27 by means of the two contact screws 3 and 3'.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A vacuum cleaner inlet door lighting device for use with a wall mounted vacuum pan assembly having a rotatable door movable from a closed position to an open position comprising:
   a circuit board securable to said vacuum pan assembly, said circuit board including at least one electrical contact providing power to said circuit board when said rotatable door is in the open position;
   a least one LED electrically coupled to said circuit board with light directed through a directional aperture for illuminating an area in front of the vacuum pan assembly when power is coupled to said circuit board.

2. The lighting device according to claim 1 wherein said circuit board includes a current limited resistor to limit the driving current to said LED.

3. The lighting device according to claim 2 wherein the driving current is limited to about 0.030 amps.

4. The lighting device according to claim 1 wherein said circuit board includes a diode to limit reverse voltage.

5. The lighting device according to claim 1 wherein said circuit board is electrically coupled in series to a facility control wiring to energize a distant relay for activating a central vacuum system.

6. The lighting device according to claim 1 wherein said circuit board operates between 24 and 36 VAC.

7. The lighting device according to claim 1 including a fiber optic cable for transferring light from a circuit board mounted LED to said directional aperture.

8. The lighting device according to claim 1 wherein said azimuth angle is about thirty one degrees relative to center line of the vacuum pan assembly and said horizontal angle is about twenty five degrees in elevation relative to the horizontal plane of the vacuum pan assembly.

9. The lighting device according to claim 1 wherein said LED is located by the rotatable door to conceal said LED when the rotatable door is placed in a closed position.

10. A vacuum cleaner inlet door lighting device for use with a wall mounted vacuum pan assembly having a rotatable door movable from a closed position to an open position comprising:
    a circuit board securable to said vacuum pan assembly, said circuit board including at least one electrical contact providing power to said circuit board when said rotatable door is in the open position;
    at least one LED electrically secured to said circuit board and positioned to direct light though a first end of a fiber optic cable for transferring light to a directional aperture positioned along a second end, said LED illuminating an area in front of the vacuum pan assembly through said directional aperture when power is coupled to said circuit board.

11. The lighting device according to claim 10 wherein said direction aperture is focused at an azimuth angle of thirty one degrees relative to center line of the vacuum pan assembly and twenty five degrees in elevation relative to the horizontal plane of the vacuum pan assembly.

12. The lighting device according to claim 10 wherein said circuit board includes a current limited resistor to limit the driving current to said LED to about 0.030 amps.

13. The lighting device according to claim 10 wherein said circuit board is electrically coupled in series to a facility control wiring to energize a distant relay for activating a central vacuum system.

14. The lighting device according to claim 10 wherein said circuit board operates between 24 and 36 VAC.

\* \* \* \* \*